United States Patent Office 3,704,158
Patented Nov. 28, 1972

3,704,158
TREATMENT OF POWDERED CHALK
George Alexander Rohan, Windsor House,
Esher, England
No Drawing. Filed Dec. 3, 1970, Ser. No. 94,940
Claims priority, application Great Britain, Dec. 4, 1969,
59,335/69; July 27, 1970, 36,222/70
Int. Cl. B44d 5/00, 1/02
U.S. Cl. 117—100 B    8 Claims

ABSTRACT OF THE DISCLOSURE

Powdered chalk having a surface which is non-reactive with acids.

---

Powdered chalk, i.e. whiting, is a suitable material for use as a filler for paper. However, it cannot be used with the alum sizing commonly used by paper manufacturers who generally use china clay as the filler.

The invention consists in an improved form of powdered chalk which has been treated to give it a surface which is non-reactive with acids and which is therefore capable of use as a filler for alum sized paper.

This may be achieved by changing the chemical nature of the surface of the powder, for example by treatment with waterglass or a solution of a water soluble phosphate. Such treatment will produce calcium silicate or calcium phosphate on the surface of the chalk and if, as will normally be the case, the reaction is carried out wet, the final product can be sold in a slurry form since it will be used in suspension in water as a filler for paper and there is accordingly no necessity to dry it. If preferred, however, the treated chalk can be dried and packed as a dry powder. The chemical reaction is a very simple and straightforward one, and naturally can be promoted by heating and stirring.

Such treatment can be carried out by immersing the powdered chalk in an aqueous solution of the phosphate, containing for example 5–80% by weight of phosphate, or the solution may be sprayed into a chamber in which the particles of chalk are maintained in suspension by air or by mechanical stirring.

The preferred phosphates are ammonium, sodium and potassium phosphates and good results can be obtained by the use of polyphosphates.

Examples of suitable phosphates are sodium hexaphosphate, sodium-tetraphosphate, potassium monohydrogen phosphate, potassium diphosphate, potassium orthophosphate, potassium dihydrogen phosphate and neutral potassium phosphate.

When the chalk is transformed into a non-acid-reacting powder by chemical reaction, this treatment can be carried out during incorporation of the chalk in the paper into which the chalk is to be incorporated as a filler, e.g. by adding phosphoric acid or other reagent to the water in the beater of a papermaking machine prior to addition of the chalk which is to be used as the filler.

Alternatively the chalk can be provided with a hydrophilic surface coating of a natural or synthetic film-forming material. Thus the chalk can be coated with a solution or dispersion of cellulose acetate, an unsaturated polyester, an epoxy resin, melamine formaldehyde resin, urea formaldehyde resin, polyvinyl chloride, polyvinyl acetate, acrylic resin, furane derivative or protein.

The coating material may also be one which reacts to some extent with the chalk, for example palmitic, oleic, lauric or oxalic acid.

Again the coating may consist of a mineral powder, for example kaolin.

EXAMPLES (1) 100 gms. of powdered chalk were immersed in 200 cc. of an aqueous solution of sodium phosphate containing 1% by weight of phosphate at a temperature of 75° C. and stirred for 30 minutes. The reaction was then complete. The water phase was poured off and the treated chalk was placed in containers in a wet condition.

The same procedure can be carried out substituting for the phosphate one of the above mentioned phosphates or utilizing an aqueous solution of waterglass.

(2) Powdered chalk was mixed with water containing in solution 20% by weight of urea and 2% by weight of hexamethylene tetramine until the chalk had taken up 10% by weight of the solution. The wet chalk was then placed in a mill, in which formaldehyde fumes were mixed with the powder with intensive stirring at a temperature of 130° C. until the water had evaporated and the resin-forming reaction was complete.

(3) Powdered chalk was mixed in a mill at a temperature of 130° C. with a 20% aqueous solution of unreacted urea formaldehyde resin containing a catalyst, the solution being fed into the mill in an atomised condition. Stirring was continued until the water had evaporated and the resin-forming reaction was complete. The resin consisted of 1 part by weight of urea, 1 part by weight of 40% formaldehyde and 0.5–3% of catalyst, which may be monoammonium phosphate, ammonium thiocyanate or zinc nitrate.

(4) Powdered chalk was mixed in a mill at a temperature of 130° C. with a 10% aqueous solution of uncured melamic formaldehyde resin containing a catalyst, the solution being fed into the mill in an atomised condition. Stirring was continued until the water had evaporated and the resin-forming reaction was complete. The resin consisted of 2–4 parts by weight of melamine, 1–3 parts by weight of 40% formaldehyde and 0.5–2% by weight of catalyst, for example hydrochloric acid, nitric acid, orthophosphoric acid or aluminum sulphate.

While the non-acid-reactive powdered chalk according to the invention is primarily intended for use as a filler for paper, it can also be used for other purposes, for example to replace ball clay as a dusting agent for fertilizers.

What I claim as my invention and desire to secure by Letters Patent is:

1. A process for preparing powdered chalk capable of use as a filler for alum sized paper, said process comprising mixing powdered chalk with an aqueous medium containing 5% to 80% by weight of a material selected from the group consisting of ammonium phosphates, sodium phosphates, potassium phosphates, waterglass, and natural and synthetic hydrophilic film-forming materials to produce a slurry of powdered chalk consisting of particles having a surface coating constituting a minor proportion of the weight of the powdered chalk but sufficient to render said powdered chalk non-reactive with alum size.

2. A process as claimed in claim 1, wherein said phosphate is sodium phosphate.

3. A process as claimed in claim 1, wherein said aqueous medium contains a film-forming coating material selected from the group consisting of cellulose acetate, unsaturated polyesters, epoxy resins, melamine formaldehyde resins, urea formaldehyde resins, polyvinyl chloride, polyvinyl acetate, acrylic resins, furane derivatives and protein.

4. Powdered chalk, capable of use as a filler for alum sized paper and consisting of discrete particles of chalk, said particles having a surface coating, constituting a minor proportion by weight of said particles and effective to render said powder non-reactive with alum size of a material selected from the group consisting of calcium phosphates, calcium silicates and natural and synthetic hydrophilic film-forming materials.

5. Powdered chalk as claimed in claim 4, wherein said surface coating consists of calcium phosphate.

6. Powdered chalk as claimed in claim 4, wherein said surface coating consists of calcium silicate.

7. Powered chalk as claimed in claim 4, wherein said surface coating consists of urea formaldehyde resin.

8. Powdered chalk as claimed in claim 4, wherein said surface coating consists of melamine formaldehyde resin.

References Cited

UNITED STATES PATENTS

| | | | |
|---|---|---|---|
| 3,260,617 | 7/1966 | Lawther | 117—100 |
| 2,308,992 | 1/1943 | Mertens | 117—100 X |
| 2,493,198 | 1/1950 | Kelley | 117—100 X |
| 2,829,982 | 4/1958 | Hoyt | 117—100 |
| 3,151,027 | 9/1964 | Cooley et al. | 117—100 X |
| 3,074,802 | 1/1963 | Alexander et al. | 117—100 X |
| 3,208,822 | 1/1963 | Baker et al. | 117—100 X |
| 3,356,449 | 12/1967 | Shoaff | 117—100 X |

FOREIGN PATENTS

| | | | |
|---|---|---|---|
| 695,372 | 8/1953 | Great Britain | 117—100 |
| 723,638 | 2/1955 | Great Britain | 117—100 |

WILLIAM D. MARTIN, Primary Examiner

M. R. P. PORRONE, Jr., Assistant Examiner

U.S. Cl. X.R.

106—288 B, 308 B; 117—118, 123 A, 123 B, 123 D, 161 LN, 169 A; 162—181 C